United States Patent [19]
Burman et al.

[11] Patent Number: 5,321,798
[45] Date of Patent: Jun. 14, 1994

[54] APPARATUS FOR PROVIDING A COMPOSITE DIGITAL REPRESENTATION OF A SCENE WITHIN A FIELD-OF-REGARD

[75] Inventors: Jerry A. Burman, Westlake Village; Walter A. Tackett, Granada Hills; Gina Berry, Northridge, all of Calif.

[73] Assignee: Hughes Aircraft Company, Los Angeles, Calif.

[21] Appl. No.: 783,746

[22] Filed: Oct. 28, 1991

[51] Int. Cl.$^5$ .............................................. G06F 15/62
[52] U.S. Cl. ..................................... 395/135; 395/133
[58] Field of Search .............................. 395/118–127, 395/133–135

[56] References Cited

U.S. PATENT DOCUMENTS 4,845,641 7/1989 Ninomiya et al. .................. 395/135
4,873,657 10/1989 Kornfeld .......................... 395/118 X

FOREIGN PATENT DOCUMENTS 0082036 11/1982 European Pat. Off. ...... G01C 21/22
2226984 9/1990 Japan ............................. H04N 7/12

OTHER PUBLICATIONS

NTIS Tech Notes Sep. 1990, Springfield, Va. US, p. 683, XP162520 NASA's Jet Propulsion Laboratory "Computer Assembles Mosaics of Satellite–SAR Imagery".

Primary Examiner—Heather R. Herndon
Assistant Examiner—Almis Jankus
Attorney, Agent, or Firm—Charles D. Brown; Randall M. Heald; Wanda K. Denson-Low

[57] ABSTRACT

A high resolution imaging system having a wide field-of-regard. The wide field image generation system (10) of the present invention is operative to provide a composite digital representation of a scene within a field-of-regard. The invention (10) includes a sensor arrangement (12, 14, and 16) for generating first and second frames of image data. A scene correlator (18) registers the first and second frames of image data within the field-of-regard. A temporal filter (22) averages image data in the first frame with image data at a respective corresponding location in the second frame to provide a third frame of image data. When displayed, the third frame of image data provides a wide field-of-regard, high resolution image with minimal undesirable seams therein.

3 Claims, 3 Drawing Sheets

APPARATUS FOR PROVIDING A COMPOSITE DIGITAL REPRESENTATION OF A SCENE WITHIN A FIELD-OF-REGARD

BACKGROUND OF THE INVENTION

1. Field of the Invention

This invention relates to systems for creating images of a scene. More specifically, this invention relates to systems operative to generate a scene image spanning a wide field-of-regard.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Infrared imaging systems are used in a variety of military and commercial applications to provide either an operator or a guidance system with a view of a scene. Such imaging systems are typically characterized as having a "field-of-regard", which refers to the angular breadth of the resultant scene image. One benefit accruing from a wide field-of-regard is that a viewer of the wide-field image may observe individual objects therein within the context of a larger scene. However, increases in the field-of-regard generally come at the expense of decreases in image resolution within conventional imaging systems.

Various methods have been utilized in an attempt to avoid the necessity of compromising image resolution to achieve a wide field-of-regard. For example, in a particular optical approach the imaging system is designed to incorporate a pair of optical lenses. One of the lenses encompasses a wide field of view, while the other covers a relatively narrow field of view. The lenses are then mechanically moved in and out of the optical train of the imaging system to alternately provide a wide field-of-regard or improved resolution. One disadvantage of this approach is that the rate at which an operator may switch between the fields of view of the two lenses is limited by the response of the servo system used to alternately interpose the lenses within the optical train. In addition, it is often difficult to capture a moving object within the field of view of the high resolution lens even though the location of the object may be readily apparent within the wider field of view.

In a second approach, an imaging sensor (typically having a relatively narrow field of view) is mounted on a gimbal scan mechanism. The gimbal is rotated to direct the field of view of the sensor to various regions within the field-of-regard, with frames of image data being produced by the sensor at a known rate (e.g. 60 Hz). Although individual regions throughout the entire field-of-regard may be viewed in isolation using this method, a composite image of the entire field-of-regard is not produced. It is also generally difficult to maintain a moving object within the sensor field of view (by rotation or scanning of the gimbal) without "smearing" the resultant image. Moreover, complex processing methods are required to create images across consecutive frames of image data.

In a third approach, image data from a number of separate sensors are used to generate a real-time image of an entire field-of-regard. The field of view of a first sensor is arranged to overlap slightly the field of view of a different sensor in order to prevent seams from appearing in the composite image. However, complex and expensive image processing hardware is typically required to implement this multi-sensor scheme. In addition, multi-sensor systems offer only minimal improvement in signal-to-noise ratio relative to single sensor systems.

It follows that a need exists in the art for a single sensor, high resolution imaging system having a wide field-of-regard.

SUMMARY OF THE INVENTION

The need in the art for a high resolution imaging system having a wide field-of-regard is addressed by the wide field image generation system of the present invention. The inventive system is operative to provide a composite digital representation of a scene within a field-of-regard. The invention includes a sensor arrangement for generating first and second frames of image data. A scene correlator registers the first and second frames of image data within the field-of-regard. A temporal filter averages image data in the first frame with image data at a respective corresponding location in the second frame to provide a third frame of image data. When displayed, the third frame of image data provides a wide field-of-regard, high resolution image with minimal undesirable seams therein.

DETAILED DESCRIPTION OF THE INVENTION

Figure 1:
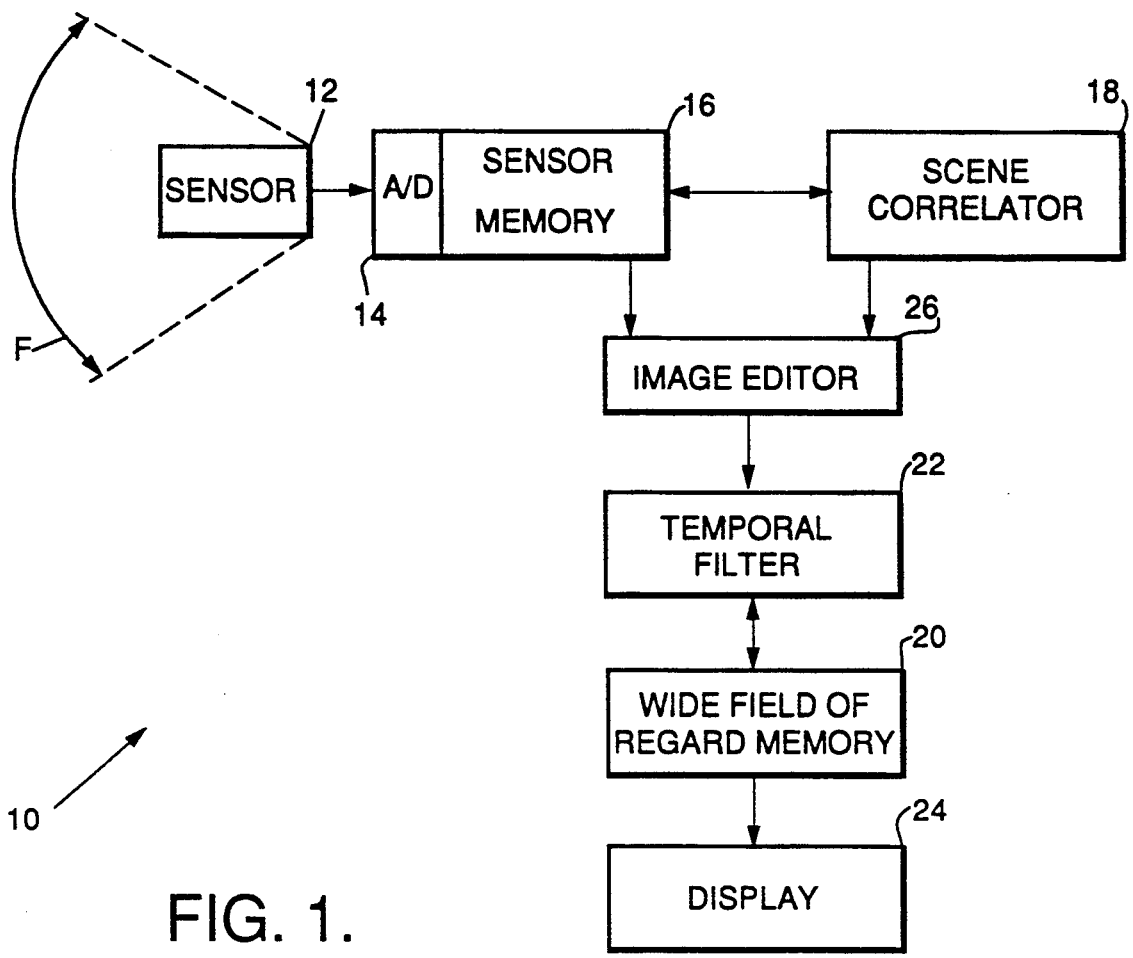
FIG. 1 is a simplified block diagram of the wide field image generation system of the present invention.

FIG. 1 is a simplified block diagram of the wide field image generation system 10 of the present invention. The inventive system 10 is operative to produce an image of a scene within a wide field-of-regard F. The system 10 may be disposed within, for example, a missile or other projectile to facilitate navigation thereof. As described more fully below, successive frames of overlapping image intensity data from a gimbal scanned sensor 12 are sampled by an analog-to-digital converter (A/D) 14 and stored in a sensor memory 16. A scene correlator 18 generates a set of offset parameters indicative of the spatial relationship between the successive image frames stored in the sensor memory 16 and registers the successive image frames of sampled data in accordance therewith. The values of sampled data (pixels) from overlapping image frames assigned by the correlator 18 to common locations within the wide field memory 20 are weighted and combined by a temporal filter 22 to selectively average the data to eliminate seams in the display 24. An additional feature is supplied by an image editor 26, which may be utilized to remove nonuniformities from the sampled image frames induced by, for example, imperfections in the sensor 12.

Figure 2:
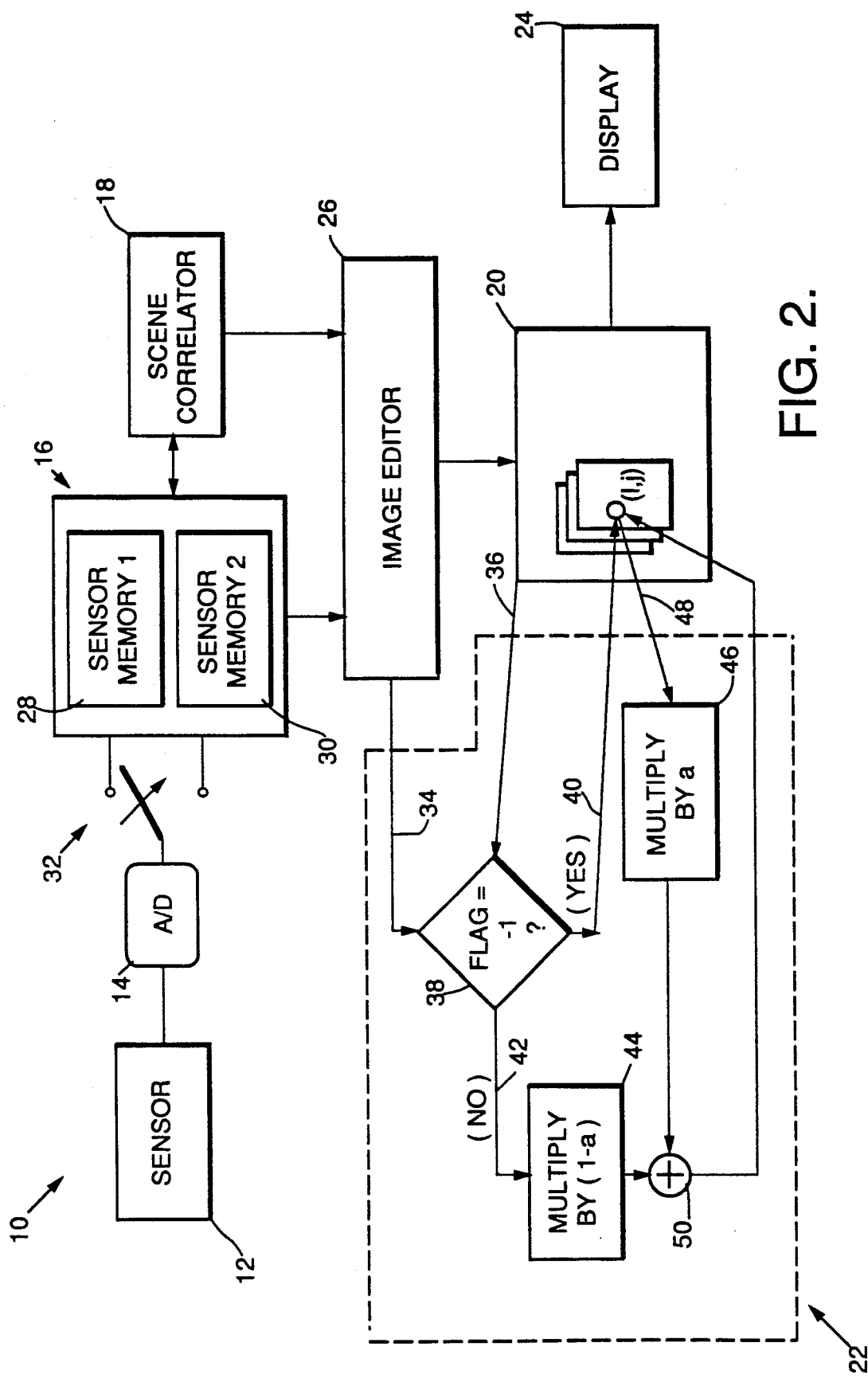
FIG. 2 shows a more detailed block diagram of the wide field image generation system of the present invention.

FIG. 2 shows a more detailed block diagram of the wide field image generation system 10 of the present invention. The sensor 12 operates to provide analog image information to the A/D converter 14 as the sensor regard F (FIG. 1). Although the sensor 12 will preferably be realized by a two-dimensional focal plane array mounted on a gimbal scan mechanism, other sensor arrangements capable of collecting video data from across the field-of-regard F may be substituted therefor. The sensor 12 is chosen to have a field of view substantially narrower than the field-of-regard F—thereby allowing the sensor 12 to be of relatively high resolution. The analog image data produced by the sensor 12 corresponds to distinct image frames within the field-of-regard. That is, the sensor 12 takes "snapshots" of the portion of the scene (not shown) within the field of view thereof at a known rate (e.g. 60 Hz). The rate of angular rotation (in azimuth) of the sensor 12 through the field-of-regard F is chosen such that a substantial portion of adjacent image frames spatially overlap.

The sensor memory 16 includes first and second sensor memory arrays 28 and 30 connected to the A/D 14 converter via an electronic switch 32. Pixel values (digitized image data) from consecutive image frames are alternately read into the arrays 28 and 30 by changing the state of the switch 32. Specifically, if pixel values from a first image frame are read into the first array 28, then pixel values from a second image frame are read into the second array 30. Pixel values from a third image frame would then replace the pixel values from the first frame stored in the first array 28.

The scene correlator 18 implements a correlation algorithm to generate offset parameters indicative of the spatial relationship between the image frames associated with the pixel values stored in the first and second arrays 28 and 30. It is noted that consecutive image frames may be spatially displaced both horizontally and vertically within the field-of-regard if, for example, the system 10 of the present invention is mounted on a moving vehicle. The correlator 18 will typically employ an iterative convolution procedure to determine the offset parameters between the first and second memory arrays 28 and 30. Specifically, the correlator 18 is operative to ascertain the number of rows and columns the second array 30 should be offset from the first such that when the displaced arrays are overlaid in the wide field-of-regard memory 20 the number of wide field memory locations having a common pixel value is maximized. In this way the offset parameters produced by the correlator 18 mirror the spatial displacement between the image frames corresponding to the pixel values stored in the arrays 28 and 30.

Since the correlator 18 does not rely on information pertaining to the orientation of the gimbal scan mechanism within the field-of-regard in generating the offset parameters, complete uniformity in the angular velocity of the sensor 12 is not required. In contrast, in conventional gimbal scanned imagers it is typically necessary to employ a complex servo system to precisely control the scan rate. The image correlator 18 may be realized using a number of techniques familiar to those skilled in the art. One such technique is disclosed by Ichida, et. al. in U.S. Pat. No. 4,220,967, entitled "Scene Tracker Using Multiple Independent Correlators", issued Sep. 2, 1980, the teachings of which are incorporated herein by reference.

The scene correlator registers the image data on a field basis by estimating the relative horizontal and vertical offsets between fields during gimbal scan motion. If frame imagery is used to generate the wide field-of-regard image, then the individual fields are correlated and interlaced to form frame segments.

Correlation is also performed between frames in order to register these segments in memory. For example, assume the pixel value from a first image frame is located in the first row and column of the first array 28, and is assigned to memory location $P(i,j)$ within wide field memory 20. Next assume that the correlator 18 indicates that the image frame stored in the second array 30 should be offset down two additional rows and over two additional columns from the image frame stored in the first array 28. The pixel value from the next (second) image frame located in the first row and column of the second array 30 would then be assigned to memory location $P(i+2,j+2)$ in the wide field memory 20 by the image editor 26 as discussed below. Thus, the coordinates of each modified pixel location are ultimately passed to the wide field memory 20.

The image editor 26 uses the row and column offset parameters generated by the scene correlator 18 to appropriately overlay, in the wide field memory 20, consecutive frames of pixel values temporarily stored in the sensor memory 16. The editor 26 also removes from the arrays 28 and 30 pixel values corresponding to, for example, the periphery of the field of view of the sensor 12. Such "edge data" may be distorted either as a result of the proximity of certain detectors to the periphery of the focal plane array within the sensor 12, or as a result of noise associated with scanning the sensor 12. The image editor 26 may be implemented with digital circuitry by way of example.

Figure 3:
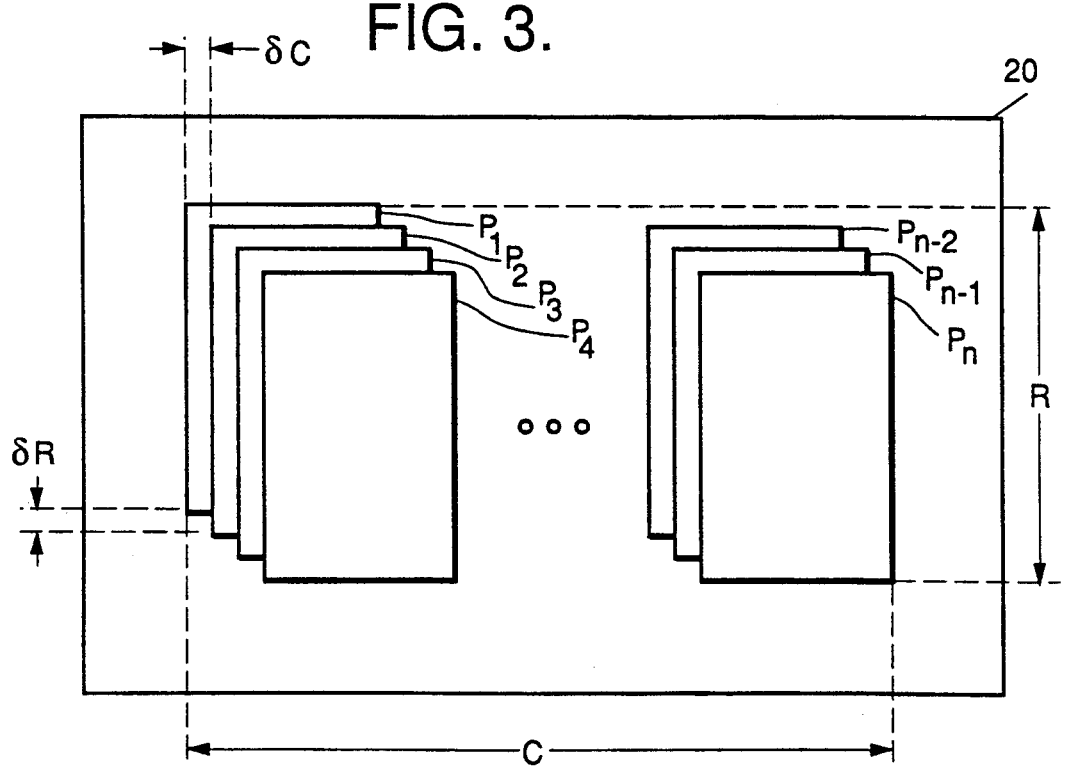
FIG. 3 illustrates the manner in which the pixel values from consecutive image frames initially stored in the first and second sensor memory arrays are overlaid in a wide field memory included within the inventive system.

FIG. 3 illustrates the manner in which the pixel values from consecutive image frames initially stored in the sensor memory arrays 28 and 30 are overlaid in the wide field memory 20. As shown in FIG. 3, frames of pixel data $P_1$ through $P_n$ are sequentially stored within the memory 20 as the sensor 12 is panned through the field-of-regard. It is observed that frame $P_2$ is offset from frame $P_1$ by $\delta R$ rows and $\delta C$ columns within the memory 20, with $\delta R$ and $\delta C$ being proportional to the offset parameters generated by the scene correlator 18. The overlaid frames of pixel data $P_1$ through $P_n$ spanning the field-of-regard occupy C columns and R rows within the wide field memory 20.

Referring again to FIG. 2, upon initiation of a scanning sequence by the sensor 12, the pixel value held by each location in the wide field memory 20 is initialized to $-1$. Thus, the presence of a $-1$ at a location within the memory 20 indicates that image data from the portion of the field-of-regard associated therewith has not yet been collected. After assigning the pixel values within the sensor memory 16 to locations within the memory 20, the image editor 26 serially passes (as indicated by the data path 34) these pixel values to the temporal filter 22. The temporal filter 22 reads (path 36) the pixel value stored in the memory 20 at the location assigned to the pixel value last transmitted to the filter 22 along path 34. This pixel value will be assumed to be assigned to location (i,j) within the memory 20 and will be denoted as I(i,j). As indicated by a pixel test block 38, if the pixel value retrieved from the memory 20 via the path 36 is a −1 then I(i,j) is placed directly into the memory 20 at location (i,j) by way of a data path 40. The pixel test block 38 may be implemented with, for example, a comparator and data register.

If the pixel value (denoted by P(n,i,j), where "n" indicates time) retrieved from the location (i,j) within the memory 20 is not a −1, then the assigned pixel value I(i,j) is sent (path 42) to a first multiplier 44. The multiplier 44 may be realized by a look up table, and is operative to multiply the assigned pixel value I(i,j) by the quantity (1−a) where "a" is an adjustable filter coefficient. The location (i,j) within the memory 20 is also linked to a second multiplier 46 by a path 48. The multiplier 46 may also be realized by a lookup table, and operates to multiply the pixel value P(n,i,j) currently occupying location (i,j) by the filter coefficient "a". The pixel values (1−a)I(i,j) and aP(n,i,j) generated by the multipliers 44 and 46 are then added by a summer 50 to create a combined weighted (filtered) pixel value denoted by P(n+1,i,j). The pixel value P(n+1,i,j) is then inserted into location (i,j) within the memory 20, and may be expressed as:

$$P(n+1,i,j)=aP(n,i,j)+(1-a)I(i,j) \qquad [1]$$

Inspection of equation [1] reveals that increases in the value of the parameter "a" lead to greater filtering of the "new" pixel data ((i,j) since the quantity (1−a) proportionately decreases. The parameter "a" will typically be adjusted by modification of the software associated with the look up tables used to realize the multipliers 44 and 46. This filtering process also contributes to an improvement in the signal-to-noise ratio at each pixel location within the memory 20. Specifically, the increase (δ) in the signal-to-noise ratio (SNR) effected by the filter 22 may be approximated by:

$$\delta SNR=(1-a^2)/(1-a)^2 \qquad [2]$$

As an example, for a filter coefficient "a" of 0.5 the improvement in SNR is approximately 3:1. Improvement in the SNR at locations within the memory 20 enhances the clarity of the wide field image provided by the display 24.

The temporal filter 22 operates to substantially prevent "seams" from developing between the individual image frames utilized to synthesize the composite wide field image. That is, were pixel data I(i,j) inserted into the memory 20 by merely replacing the preexisting pixel data P(n,i,j) such seams (differences in brightness between adjacent image frames) could potentially appear in the displayed wide field image. Differences in brightness between consecutive frames may occur due to, for example, noise associated with scanning the sensor 12 or the operation of automatic gain control circuitry. The unity gain of the filter 22 allows the filtered pixel values to be immediately inserted into the memory 20 without undergoing a scaling operation.

It is also noted that the filter 22 is of the infinite impulse response (IIR) variety, which reduces memory and computational requirements relative to finite impulse response (FIR) designs. That is, in certain FIR filter implementations the inclusion of a large number of pixel values in the filtering process may impede the efficacy thereof. IIR filters may be synthesized from a desired filter function by finding the impulse transfer function ("z" transform) thereof. The terms within the z transform are then realized either in hardware or software. In the filter 22, the number of pixel values that are computed and processed for each location in memory 20 is a function of the gimbal scan rate and does not adversely affect performance.

As mentioned above, the display 24 is operatively coupled to the wide field memory 20. The display 24 may constitute a conventional television monitor or a display typically used with conventional infrared imagers (such as the RS-170, having 525 horizontal lines).

As the sensor is scanned from left to right through the field-of-regard, image data may be provided to the display 24 immediately upon being stored in the memory 20. In a first operative mode the memory 20 is reinitialized (a −1 is placed in each memory location) at the end of each left to right scan. As the sensor then scans from left to right the memory 20 is filled with pixel data in the manner discussed above with reference to the left to right scan. Again, at the conclusion of each left to right scan the memory 20 will be reinitialized prior to commencing the next left to right scan.

In a second operative mode a supplementary wide field memory (not shown) is utilized to store pixel data collected during right to left scanning, while the wide field memory 20 serves to store pixel values collected during left to right scanning. Thus, prior to the occurrence of any scanning both the supplementary memory and the memory 20 would be initialized by placing a -1 in each location. During the initial left to right scan the pixel data accumulated in the memory 20 would be supplied to the display 24. At the conclusion of the first left to right scan the memory 20 would not be reinitialized, and the sensor 12 would begin a right to left scan with the data therefrom being stored in the supplementary memory. During the right to left scan the display 24 would be driven by data within the supplementary memory. Similarly, at the beginning of the second left to right scan the display 24 would again be connected to the memory 20 and neither the memory 20 nor the supplementary memory would be reinitialized.

Figure 4:
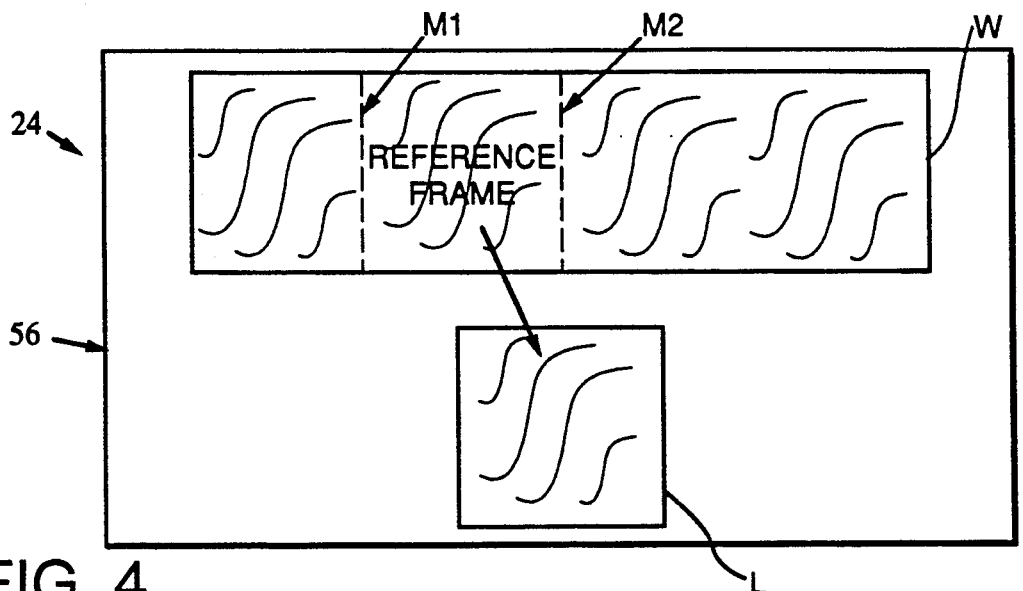
FIG. 4 illustrates a viewing mode in which pixel data from the wide field memory and from the image frame most recently stored in a sensor memory are simultaneously displayed on a monitor included within a video display.

FIG. 4 illustrates a viewing mode in which pixel data from the wide field memory 20 and from the image frame most recently stored in sensor memory 16 are simultaneously displayed on a monitor 56 included within the display 24. Specifically, in the front view of FIG. 4 a wide field image W and a "live" image L are displayed on the monitor 56. The wide field image W is formed as described above on the basis of the pixel values within the memory 20, while the live image L is created by displaying the unfiltered pixel data from the last image stored in the memory 16. As shown in FIG. 4, symbology markers M1 and M2 are used to demarcate the location of the live image within the field-of-regard. The markers M1 and M2 may be generated by reference to the instantaneous angular orientation of the sensor 12.

Alternatively, the markers M1 and M2 can be manually controlled by an operator to select a reference frame (again defined by symbology markers M1 and M2) within the wide field image W. The pixel data giving rise to the reference frame within the wide field image W is then contemporaneously displayed in the form of the image L. The symbology markers may be manually translated with the assistance of, for example, a dial sensor with an accompanying software driver.

In addition to scanning horizontally across the field-of-regard, the sensor 12 may be redirected in the elevational dimension at the conclusion of selected horizontal scans. For example, the elevational angle of the sensor 12 may be increased at the conclusion of each left to right scan and decreased by the same amount at the conclusion of each right to left scan to augment the vertical (elevational) dimension of the field-of-regard. This feature of the present invention may be described with reference to the illustrative representation of the wide field memory 20 depicted in FIG. 5.

Figure 5:
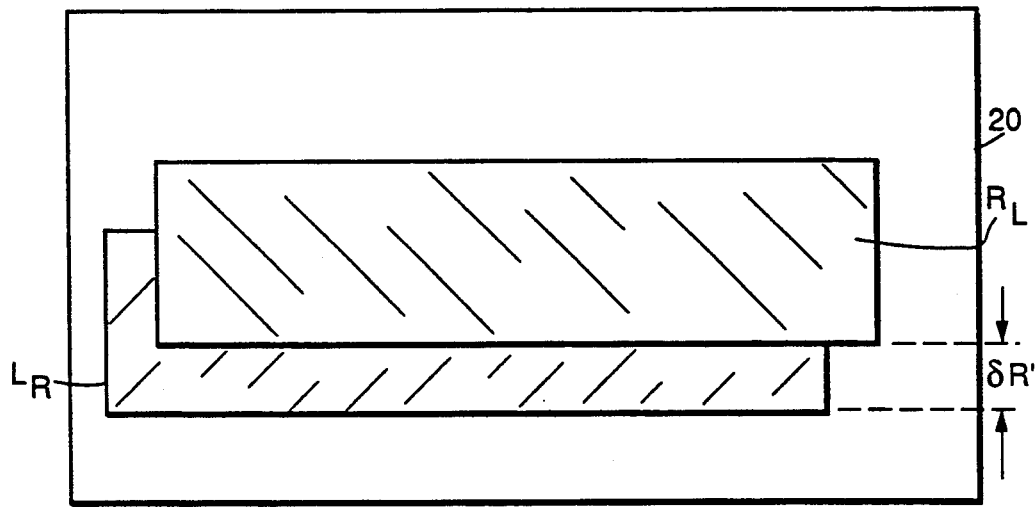
FIG. 5 illustrates the manner in which pixel data from scans taken in opposing horizontal directions and differing elevational orientations are stored in the wide field memory.

As shown in FIG. 5, the sensor 12 is oriented in the elevational dimension such that pixel data from a left to right scan across a lower portion of an augmented field-of-regard is stored in the block of memory locations $L_R$. At the conclusion of the left to right scan the elevational angle of the sensor 12 is increased, and pixel values from the ensuing right to left scan are stored in the block of memory locations $R_L$. A second scene correlator (not shown) will be employed to generate offset parameters enabling registration of blocks $L_R$ and $R_L$ within the memory 20. For example, the correlator 18' could be operative to correlate the last frame of pixel values in block $L_R$ with the first pixel value frame within the block $R_L$ to generate an elevational offset parameter. This offset parameter would be proportional to the number of rows ($\delta R'$) which the blocks $R_L$ and $L_R$ should be separated in the memory 20. The technique described with reference to FIG. 5 may be utilized to create a "downrange map" of a scene within the augmented field-of-regard.

Figure 6:
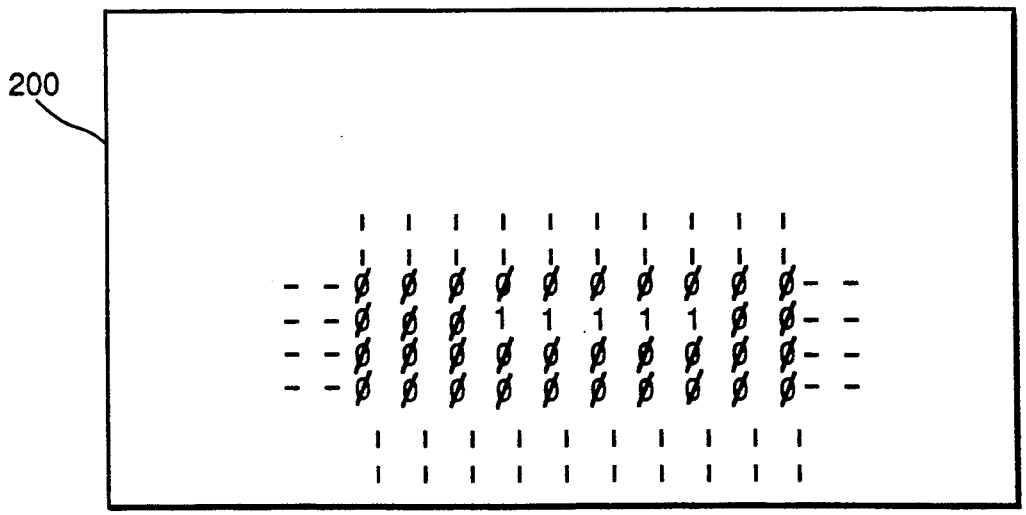
FIG. 6 shows a binary memory, equivalent in dimension to the wide field memory, used in a technique to detect the presence of a potential moving object within the field-of-regard.

In a particular embodiment, the present invention may be employed to detect the presence of a potential moving object within the field-of-regard. This feature of the present invention will be explained with reference to FIG. 6, which shows a binary memory 200 equivalent in dimension to the memory 20. Each location in the memory 200 is identified with one companion location in the memory 20. At the commencement of scanning each location within the memory 200 is initialized to zero. If an object is in motion within the field-of-regard, then pixel values within the memory 20 associated with regions in the field-of-regard in the path of the moving object will change over time. This condition may be detected by placing a "1" in the companion locations in memory 200 associated with locations in the memory 20 having pixels which change in value in excess of a threshold amount between scans. If a spatially consecutive sequence of "1's" appears in the memory 200, a potential moving object is identified. The threshold change which must be exceeded to generate a "1" in the memory 200 will be a function of the filter parameter "a" and the gimbal scan rate.

The direction of motion of the potential moving object can be discerned with knowledge of the instantaneous gimbal scan direction and the manner in which the 1's appear within the memory 200. For example, if the gimbal is scanning left to right and the object under surveillance is moving from right to left within the field-of-regard then the row of 1's shown in FIG. 6 will appear from right to left in time. Similarly, if the sensor scan is left to right and the object is moving from left to right, then the row of 1's will appear from left to right as a function of time. A similar analysis may be applied to ascertain the rate of motion to the extent that the scan rate and the rate at which the 1's appear in the memory 200 are known.

While the present invention has been described herein with reference to a particular embodiment, it is understood that the invention is not limited thereto. The teachings of this invention may be utilized by one having ordinary skill in the art to make modifications within the scope thereof. For example, the inventive wide field image generation system is not limited to a particular sensor scanning arrangement. Any sensing device capable of providing a sequence of framed image data may be used in the manner disclosed herein. In addition, the present invention is not limited to embodiments employing the aforementioned temporal filter to process pixel data prior to storage in a wide field memory. Those skilled in the art may be aware of other schemes suggested by the teachings herein for enhancing the continuity of the composite wide field image.

It is therefore contemplated by the appended claims to cover any and all such modifications.

Accordingly,

What is claimed is:

1. Apparatus for providing a composite digital representation of a scene within a field-of-regard comprising:
    a sensor for generating first and second frames of analog image data;
    an analog to digital converter connected to said sensor for digitizing said first and second frames of image data;
    a first memory for storing said first digitized frame of image data;
    a second memory for storing said second digitized frame of image data;
    a correlator for registering said first and second stored digitized frames of image data;
    a third memory for storing said at least a portion f said first and second registered frames of image data and
    a temporal filter for weighing, combining and averaging the data stored in said third memory.

2. The invention of claim 1 further including means for converting the digital signals stored in said third memory to analog output signals.

3. The invention of claim 2 further including means for displaying said analog output signals.

* * * * *